3,703,370
PRODUCTION OF BLACK AND WHITE PRINTS FROM COLOR TRANSPARENCIES BY ELECTROSTATIC PROCESS

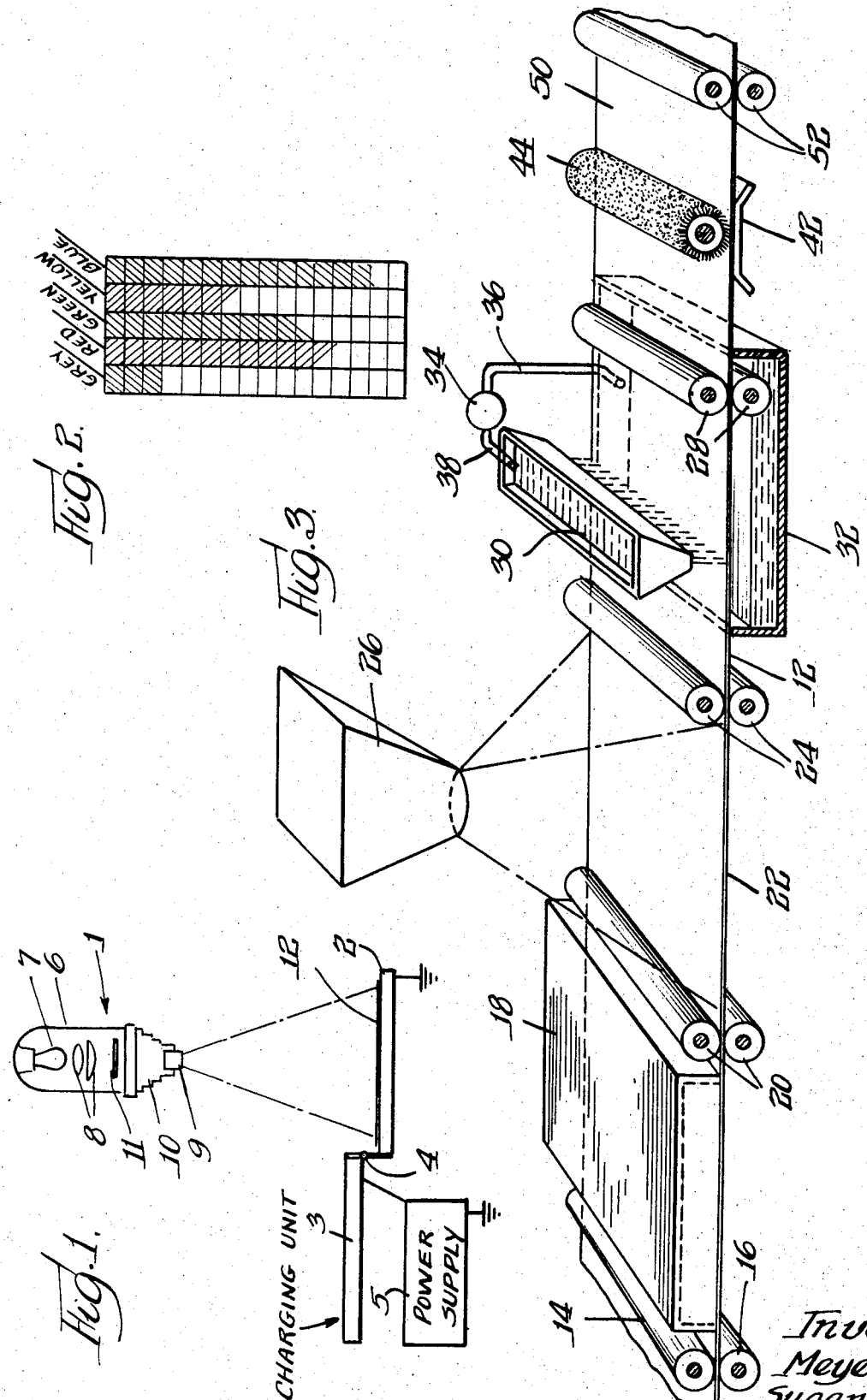

Meyer L. Sugarman, Northbrook, and Thomas A. Wilkie, Evanston, Ill., assignors to Opto/Graphics, Inc., Kenilworth, Ill.
Filed July 22, 1969, Ser. No. 843,468
Int. Cl. G03g 13/00, 9/04
U.S. Cl. 96—1 LY           1 Claim

ABSTRACT OF THE DISCLOSURE

Dyes are blended with a zinc oxide and resin mix before application to a paper or other printing base for electrostatic printing. The dyes are selected to render the paper essentially panchromatic, whereby direct black and white prints are made at low cost from a color transparency.

BACKGROUND OF THE INVENTION

It is often necessary for many diverse purposes to produce black and white prints corresponding to color transparencies. In the graphic arts, and particularly in the setting up of catalogs, it is common to take pictures in color as color transparencies for use in the final catalog. However, the only practical way of arranging the catalog pages is by way of "paste-ups." A blank page is prepared the same size as a catalog page, and black and white prints are made which are cut as desired, and pasted to the page, leaving appropriate room for page numbers, printing, etc.

Obtaining of the black and white prints necessary has been both difficult and expensive. It has been necessary to use autopositive systems which are not readily available, and which are expensive and difficult to use, or to use an intermediate negative step. Due to such difficulties with the prior art, it is common practice to take two photographs, one as a color transparency, and one on negative black and white film, the black and white prints being made from the latter. However, this process is not entirely satisfactory.

The film base for color transparencies is cellulose acetate which is susceptible to changes in size in accordance with temperature and moisture. Hence, the final color transparency, having been thoroughly soaked, and sometimes changed in temperature in processing may be significantly different from the size of the film before exposure. On the other hand, black and white film now normally uses a polyester base which is quite stable. Hence, even though the color transparency may change size, the black and white negative will not. On the other hand, the paper on which the black and white print is made is commonly soaked during processing, and this will cause the paper to change size to some extent. As a result, the black and white print typically will not be quite the same size as the color transparency. Thus, even though paste-ups are used in the making of a catalog page or the like, the final result utilizing the color transparency, by means of a contact print, may not quite fit.

A somewhat similar problem arises in the setting up of text books, year books, or magazines, etc. wherein portions of a color transparency may be enlarged varying degrees for printing on a page. Again, paste-ups are used, but subject to the problems noted heretofore. Furthermore, the person making the paste-ups usually has to send the transparency out for the making of the black and white prints, thereby leading to delay and expense.

Furthermore, as will be apparent, color prints are often too expensive and too complicated for an amateur to make himself, and too expensive to purchase commercially in quantities. Thus, it is desirable that an amateur be able to print his color transparencies in black and white in order to disseminate the pictures, either commercially or simply to share them with friends and relatives. Furthermore, as is recognized, the dyes used in the making of the transparencies are not permanent, whereas a black and white print can be quite permanent thus further emphasizing the desirability of the simple and inexpensive production of black and white prints from color transparencies.

SUMMARY OF THE INVENTION

In accordance with the present invention, selective dyes are mixed in with the zinc oxide and resin coating for a paper or other base before application of the coating to the paper. The dyes are of such nature as to render the resulting electrostatic paper essentially panchromatic.

An ordinary enlarger may be used with a grounded metal base plate or easel with a swing out charging unit for electrostatically charging the paper, following which an exposure is made directly on the paper to dissipate the charge selectively in accordance with the amount of the light falling on the paper. The paper then may be processed with the liquid toner produced in accordance with the present invention in existing or suitable processing machinery of relatively simple nature to produce the final black and white print.

Alternatively, the printing can be done on a more or less continuous or production line basis, with the paper either in the form of sheets or a continuous web fed beneath the charging unit, then exposed, and subsequently processed, all in one continuous operation.

Accordingly, it is an object of the present invention to provide an apparatus, method and paper coating formulation for producing black and white electrostatic prints from color transparencies.

THE SPECIFICATION

The principles of the present invention will be readily understood with reference to the following description, particularly when taken in connection with the accompanying drawings, wherein:

FIG. 1 comprises a somewhat schematic elevational view of an enlarger and charging unit in accordance with the present invention.

FIG. 2 comprises a step wedge or spectrum analysis of the sensitivity of the printing paper produced in accordance with the present invention;

FIG. 3 comprises a schematic view of a continuous process in accordance with the present invention.

Zinc oxide and resin formulations for the coating of paper for electrostatic printing are well known in the art, and the present invention is applicable with any such formulations. However, inasmuch as the present invention has particular utility with continuous tone printing, one satisfactory example is set forth hereinafter.

In accordance with the present example, we use a zinc oxide identified as New Jersey Zinc CT–011, sold by the New Jersey Zinc Company, 160 Front St., New York, N.Y. This zinc oxide is characterized in the possession of low contrast qualities and fine particles size. The low contrast and fine particle size are believed to be due to a manufacturing process which is believed to be a trade secret.

The foregoing zinc oxide is mixed with a resin binder, specifically Gelva 264, sold by Monsanto Company, 800 N. Lindbergh Blvd., St. Louis, Mo., which is a co-polymer of polyvinyl acetate/maleate.

300 grams of the zinc oxide identified and 60 grams of the Gelva 264 are mixed with 300 milliliters of almost any aromatic hydrocarbon solvent, toluene being a preferred example, to produce a slurry which is subsequently coated on paper or other printing base or substrate. The foregoing formulation is satisfactory for the production of black and white prints from a black and white positive. However, if attempts are made to print direct from a color transparency, the colors will not be reproduced in their proper relative intensities. With reference to the step wedge of FIG. 2, it will be observed that for proper relative reproduction of the colors, the blue sensitivity of the emulsion must extend to a greater distance than any other color sensitivity, followed by red, subsequently by green, and last by yellow. There should be a gray sensitivity of still lesser degree, as indicated in order to provide proper contrast or snappiness in the finished print.

In order to obtain this objective, color sensitizing dyes are mixed in with the foregoing slurry before application to the paper or other substrate.

Example No. 1

One satisfactory formulation for obtaining the desired color sensitivity utilizes the following dyes:

Auromine O
Chrome Black T
Bromophenol Blue
Alphazurine 2G
Uranine
Dibromofluorocein The foregoing is mixed in equal quantities to produce a total weight of from .02–.06% (optimally .03%) of the weight of the zinc oxide solids in the coating formulation.

Example No. 2

The following dyes were mixed in the quantities indicated, the percent being by weight relative to the weight of the zinc oxide solids in the formulation.

|  | Percent |
|---|---|
| Fluorescent Yellow | .03 |
| Dibromofluorocein | .005 |
| Alphazurine 2G | .005 |

Example No. 3

The following dyes are mixed in equal quantities to produce a total of .02–.05% by weight of the zinc oxide solids:

Bromo Cresol Green
Auromine O
Eosin Y

An embodiment of the invention particularly useful by an amateur or a paste-up man, i.e., one well suited for low volume production, is shown in FIG. 1, wherein a photographic enlarger is shown as including a grounded metal base plate or easel 2 on which a sheet of paper with the foregoing coating formulations is placed, the sheet being identified as 12. An electrostatic charging unit 3 is pivotally connected to the base 12 by a pivot 4 for swinging charging position above the base plate, or out of position as shown. A high voltage direct current power supply 5 is connected to the charging unit, being appropriately grounded on one side, as indicated.

The enlarger also includes a lamp housing 6 having a lamp 7 therein and a suitable condensing lens system 8. The projection lens 9 is supported by a suitable focusing structure which may include a bellows 10, in accordance with conventional practice. A color transparency or slide 11 is carried in the lamp housing by means of a suitable carrier, conventionally referred to as a "negative carrier," although the word "negative" is inappropriate in the present positive-to-positive process.

As will be apparent in accordance with the example of FIG. 1, the enlarger is located in a room, closet, booth, etc. in which the lighting is subdued. Substantially total darkness is not necessary as in a conventional darkroom using silver bromide or silver chloride printing paper, since the zinc oxide coated paper is relatively unaffected by light until after it has been charged. Thus, the paper 12 may be placed on the enlarger base or easel 2 with a sufficiently high ambient light level to allow ready handling on the part of the person making the print. Subsequently, the lights are switched off or significantly dimmed, and the charging unit is positioned above the paper and turned on for a suitable length of time to charge the paper. The charging unit is then swung out of the way, and the lamp 7 is energized to project the image from the transparency 11, onto the paper 12 for the requisite time. The paper is then toned or developed in a suitable or commercial toner in a suitable or commercially available apparatus. In accordance with the preferred example, a specific additive is provided in the toner formulation to improve suspension of the toner pigments in the liquid carrier, and subsequently to cause the pigment particles to adhere in a superior fashion to the paper in the finished print. Likewise in accordance with the preferred example, an additional additive is incorporated in the toner to provide, in combination with mechanical buffing, a glossy surface to the final print.

As will be apparent, a contrast print can be made by placing the transparency on the paper and exposing with the light from the enlarger.

Thus, turning to the embodiment of the invention illustrated in FIG. 3, and utilizing the additives specified in the co-pending appliactions of Thomas A. Wilkie application for Toner Formulation for Electrostatic Printing, Ser. No. 843,231, filed July 18, 1969 now abandoned and Meyer L. Sugarman, for Production of Glossy Electrostatic Prints, Ser. No. 842,496, filed July 17, 1969 the disclosures of which are incorporated herein by reference, the printing base 12 is shown as a continuous web of paper suitably coated as with zinc oxide. Alternatively, this could be a succession of sheets of paper. The printing base web 12 enters between upper and lower input rollers 14 and 16, respectively rotating counterclockwise and clockwise in the position shown in the drawings, whereby to feed the printing base material from left to right. The printing base material passes below an electrostatic charging unit 18 of a type well known in the art, and subsequently between additional feed rollers 20 which are counter-rotating to move the paper onto the right. An image is projected onto the printing base 22 following the charging in the area between the rollers 20 and a successive pair of counter-rotating rollers 24, again rotating so as to feed the printing base on toward the right. The image is shown as being projected from a photographic enlarger 26, but other means can be used for impressing the image on the paper as is well known in the art.

Following the pair of rollers 24 the base is fed along a continuous path in a straight line to output rollers 28 likewise counter-rotating to continue feeding the paper or other printing base to the right. Preferably the arrangement of parts in this area is as described in the co-pending application of Meyer L. Sugarman and Joseph H. Jaeger, Ser. No. 692,234, filed Dec. 20, 1967 recently divided and refiled as Compact Liquid Toner Apparatus With Straight Through Feed by the same inventors under Ser. No. 859,219, filed on July 11, 1969, now U.S. Pat. 3,643,628, and Compact Liquid Toner Apparatus With Straight Through Feed by the same inventors under Ser. No. 841,097, filed on July 11, 1969, now U.S. Pat. 3,621,814.

As shown in the present application, there is a trough 30 spaced above the printing base and extending transversely thereacross. A sump 32 underlies the printing base and the rollers 28 to collect excess liquid toner, and the toner is pumped by a pump 34 through conduits or pipes 36 and 38 from the sump to the trough. The trough is provided at the bottom portion with a plurality of apertures, or with a continuous slot through which the toner issues as a gravitationally falling curtain 40 which collects on the top surface of the paper and is dammed up against the upper roller 28 to be squeegeed therefrom by the rollers, with the excess toner falling off the sides of the paper into the sump 32.

The paper or other printing base 12 upon exiting from the rollers 28 passes across a slide plate 42 which can be of metal or plastic construction. If the slide plate is of metal, it has a coating on the top surface thereof of a very low friction plastic, such as "Teflon." A roller or brush 44 is disposed transversely across the printing base and in surface engagement therewith, exerting mild pressure on the printing base 12. As may be seen best in FIG. 2 the roller comprises a central inner portion or cylinder 46 of a suitable construction, and having a covering 48 thereon which may be similar to the covering on a conventional paint roller, i.e., it can be a plush such as acrylic, or it can be any other suitable fibrous or fabric material that is not likely to scratch. The roller 44 is driven by any suitable power source, including the power source which drives all of the heretofore mentioned rollers in common. The roller 44 is driven counter-clockwise in the present illustrative example, and at such a speed that the linear rate of travel of the periphery of the roller is somewhat greater than the linear speed of the printing base, whereby there is a buffing action of the roller on the surface of the printing base. In a typical example, the roller has a diameter of approximately 2½ inches and turns at 1000 r.p.m. with a paper feed of from one to four inches per second. This produces a glossy surface on the printing base, as is indicated at 50. It will be appreciated that the roller turns in the direction of feed of the printing base as this applies a slight tension to the printing base, which, typically is paper, thereby maintaining the base under tension. Under some circumstances it is contemplated that the roller could turn in the opposite direction, but it will be appreciated that this would tend to buckle the paper, and therefor is generally undesirable for use with a flexible printing base such as paper.

After leaving the roller 88 and slide plate 42 the printing base passes between another pair of counter-rotating feed rollers 52 to exit from the machine or process, the paper subsequently being severed into separable sheets, or otherwise handled as desired.

By way of summary, the additive for holding the pigment particles in suspension and thereafter causing it to adhere to the paper is Du Pont Fuel Oil Additive No. 2, which is 50% methacrylate polymer, 50% kerosene. The additive for producing the glossy finish is polyvinyl ether. The polyvinyl ether is insoluble in aliphatic hydrocarbons. It is thought that the polyvinyl ether particles attached themselves to the particles of the Fuel Oil Additive No. 2, and the Fuel Oil Additive No. 2 particles attach themselves to the aliphatic hydrocarbons to hold the polyvinyl ether in suspension. During toning or developing, the particles of polyvinyl ether are deposited as a resinous coating surrounding each pigment particle. When the print is thereafter mechanically buffed, the resinous coating squashes out to provide a waxy, shiny appearance. This toner can be used with the example of FIG. 1, and the buffing can be done by way of a facial tissue, or any number of other items to produce the glossy finish to the print.

The invention is claimed as follows:

1. Process for the electrostatic production of black and white prints from color transparencies comprising: the steps of providing a continuous tone panchromatic sensitive electrostatic printing base comprising a zinc oxide coated paper having dyes in the coating, charging said base, light impressing an image on said charged base from a color transparency with white light, and thereafter toning said base with a liquid hydrocarbon toner having black pigment particles and an additive therein for holding said pigment particles in suspension and for thereafter adhering the pigment particles to the printing base, to produce a black and white image, the toning being effected in a toner having therein a buffable material comprising polyvinyl ether, and including a further step of relatively moving a buffing material across the surface of said coating on said base, buffing the printing base after fixing of the image thereon to provide a glossy finish to said image.

References Cited

UNITED STATES PATENTS

| | | | |
|---|---|---|---|
| 3,051,569 | 8/1962 | Sugarman et al. | 96—1.7 X |
| 3,052,540 | 9/1962 | Greig | 96—1.7 X |
| 3,251,687 | 5/1966 | Fohl et al. | 96—1.7 X |
| 3,362,907 | 1/1968 | Matkan et al. | 252—62.1 |
| 3,417,019 | 12/1968 | Beyer | 96—1 L X |
| 3,476,559 | 11/1969 | Panken | 96—1.7 |

OTHER REFERENCES

Dessaner and Clark, Xerography, 1965, pp. 357–363.
Du Pont Products Book, p. 83.

GEORGE F. LESMES, Primary Examiner

J. R. MILLER, Assistant Examiner

U.S. Cl. X.R.

96—1.7; 117—37 LE; 252—62.1; 355—3